Dec. 1, 1931.  G. WILLIAMS  1,834,193
WINDSHIELD
Filed Aug. 21, 1930   2 Sheets-Sheet 1
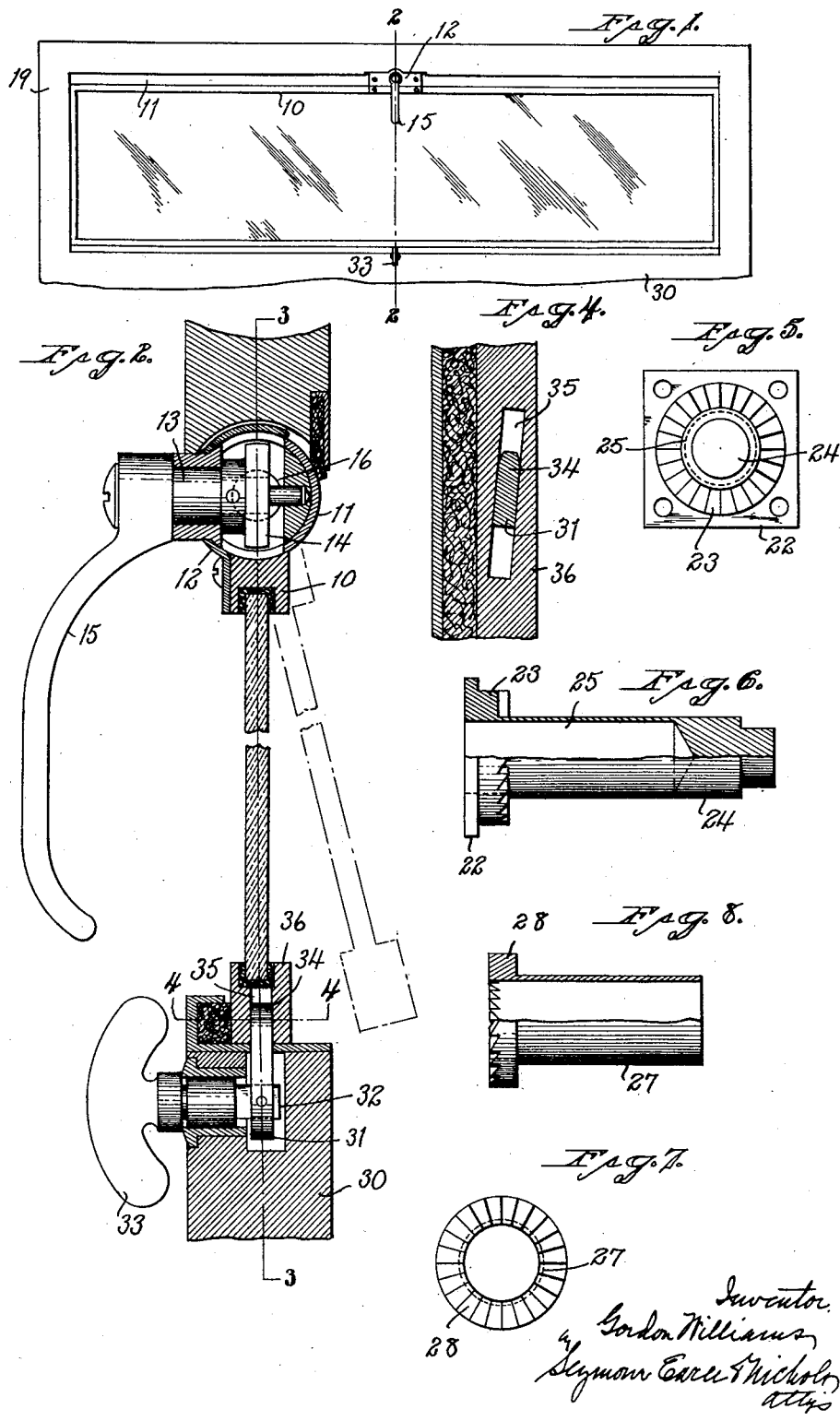

Dec. 1, 1931.  G. WILLIAMS  1,834,193
WINDSHIELD
Filed Aug. 21, 1930  2 Sheets-Sheet 2
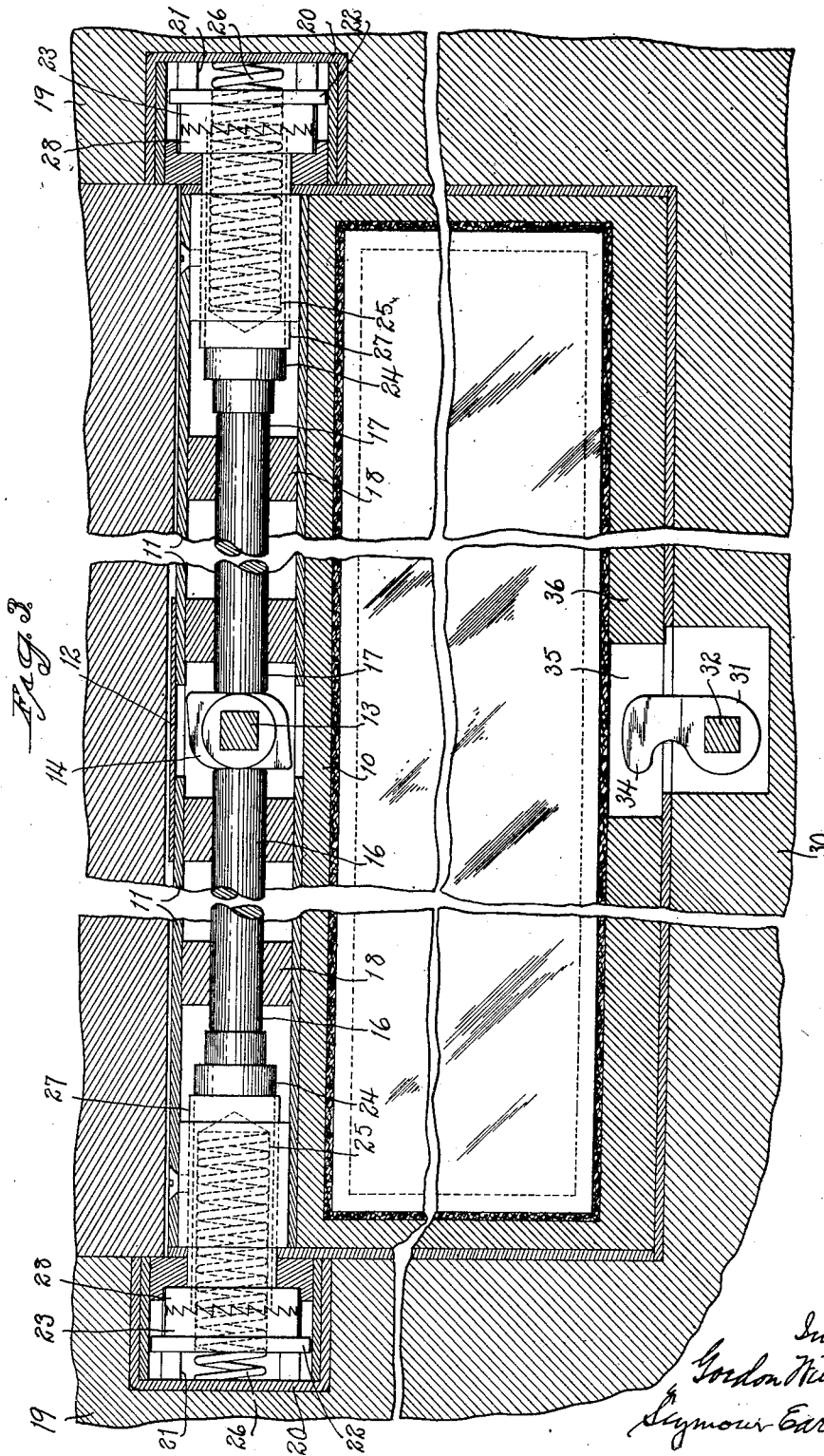

Patented Dec. 1, 1931

1,834,193

UNITED STATES PATENT OFFICE

GORDON WILLIAMS, OF MOUNT CARMEL, CONNECTICUT

WINDSHIELD

Application filed August 21, 1930. Serial No. 476,772.

This invention relates to an improvement in windshields for automobiles, and the object of the invention is to provide a construction by which the windshield may be readily operated by one hand and locked in its various positions of adjustment, and the invention consists in the construction as hereinafter described and particularly recited in the claim.

In the accompanying drawings:

Fig. 1 is a front view of a windshield constructed in accordance with my invention;

Fig. 2 is a sectional view on the line 2—2 of Fig. 1, enlarged;

Fig. 3 is a sectional view on the line 3—3 of Fig. 2;

Fig. 4 is a sectional view on the line 4—4 of Fig. 2;

Fig. 5 is an end view of one of the movable clutch-members;

Fig. 6 is a broken side view of the same;

Fig. 7 is an end view of the fixed clutch-member; and

Fig. 8 is a broken side view of the same.

The windshield frame 10 has a tubular top-bar 11, and secured to this top-bar preferably at the center, is a housing 12 in which is mounted a stud 13, and connected to this stud is a double-ended cam 14. Secured to the outer end of the stud is an operating-handle 15. On either side of the cam and adapted to be operated thereby are push-rods 16 and 17 guided for longitudinal movement by blocks 18. Mounted in each side of a casing 19 are yokes 20, each carrying four guide-pins 21 which may be screwed or riveted to the yoke 20, and riding on these pins on each end and guided thereby is a plate 22 formed integral with one member 23 of a ratchet-clutch, and projecting inward from the clutch are stems 24 formed at their outer ends with inwardly-extending chambers 25 to receive springs 26 which bear against the yoke 20. Around the stems 24 are sleeves 27, at the outer end of which are complementary ratchet-clutch-members 28, these members, with their sleeves, being held against rotation by being permanently connected with the tubular top-bar 11. The ends of the stem 24 bear against the ends of the rods 16 and 17.

Mounted in the lower edge 30 of the casing is a locking-dog 31 mounted upon an angular shaft 32, which is provided with an operating finger-piece 33, and the hooked end 34 of the dog is adapted to extend through a slot 35 in the lower bar 36 of the windshield-frame, and preferably this slot 35 is arranged at an angle, so that the dog will tend to draw the shield against the casing when in its closed position.

To open the windshield, the locking-dog is first retired, so as to release the windshield, which may then be pushed out to any desired extent, the springs 25 yielding to permit the ratchet-clutch-members 28 to ride over the member 23, so that the shield will be locked by the ratchet-clutch-members in any position, or the windshield may be opened by pushing outward upon the handle 15.

To close the windshield, the handle 15 is turned in either direction, so as to rock the double-ended cam 14, which moves the rods 16 and 17 outward, forcing the members 23 of the clutch outward against the tension of the springs 25, thus leaving the windshield-frame free to be moved inward to the desired extent and when in the desired position, the handle is moved back, permitting the clutches to re-engage. When brought to the closed position, the windshield may be again locked by moving the locking-dog 31.

I thus provide, in a very simple way, means for firmly holding a windshield in various positions, and operated by the movement of one hand, that is, when the shield is unlocked, it may be pushed outward with one hand and be firmly held in any position of adjustment, and by a movement of the operating-handle 15, the windshield may be brought to its closed, or any intermediate, position and firmly held when the operating-handle is released.

I claim:

A windshield comprising a tubular top-bar, a housing connected with said bar, an operating-handle mounted in said housing and having an inwardly-extending stem, a double-ended cam mounted on said stem, longitudinally-guided rods on opposite sides of said cam and adapted to be moved thereby, inner ratchet clutch-members connected with the ends of said top-bar and formed with sleeves, outer movable ratchet clutch-members engaging the fixed member and formed with a sleeve extending through the sleeve of the fixed member, said stems extending into engagement with the outer ends of said rods, said stems longitudinally recessed, springs mounted in said recesses, a yoke in each side of the windshield-casing, and movable members of the clutches longitudinally-guided in said yokes, and means to prevent the rotation of the outer clutch-members.

In testimony whereof, I have signed this specification.

GORDON WILLIAMS.